Feb. 10, 1953 L. A. HAUTAU ET AL 2,627,770
POWER-OPERATED, PREDETERMINED-TORQUE CONTROL SOCKET WRENCH
Filed Sept. 8, 1951 4 Sheets-Sheet 1

INVENTORS
LLEWELLYN A. HAUTAU
CHARLES F. HAUTAU
BY Edward M. Apple
ATTORNEY

Feb. 10, 1953 — L. A. HAUTAU ET AL — 2,627,770
POWER-OPERATED, PREDETERMINED-TORQUE CONTROL SOCKET WRENCH
Filed Sept. 8, 1951 — 4 Sheets-Sheet 2

INVENTORS
LLEWELLYN A. HAUTAU
CHARLES F. HAUTAU
BY Edward M. Apple
ATTORNEY

Feb. 10, 1953 L. A. HAUTAU ET AL 2,627,770
POWER-OPERATED, PREDETERMINED-TORQUE CONTROL SOCKET WRENCH
Filed Sept. 8, 1951 4 Sheets-Sheet 3

INVENTORS
LLEWELLYN A. HAUTAU
CHARLES F. HAUTAU
BY Edward M. Apple
ATTORNEY

Feb. 10, 1953     L. A. HAUTAU ET AL     2,627,770
POWER-OPERATED, PREDETERMINED-TORQUE CONTROL SOCKET WRENCH
Filed Sept. 8, 1951     4 Sheets-Sheet 4
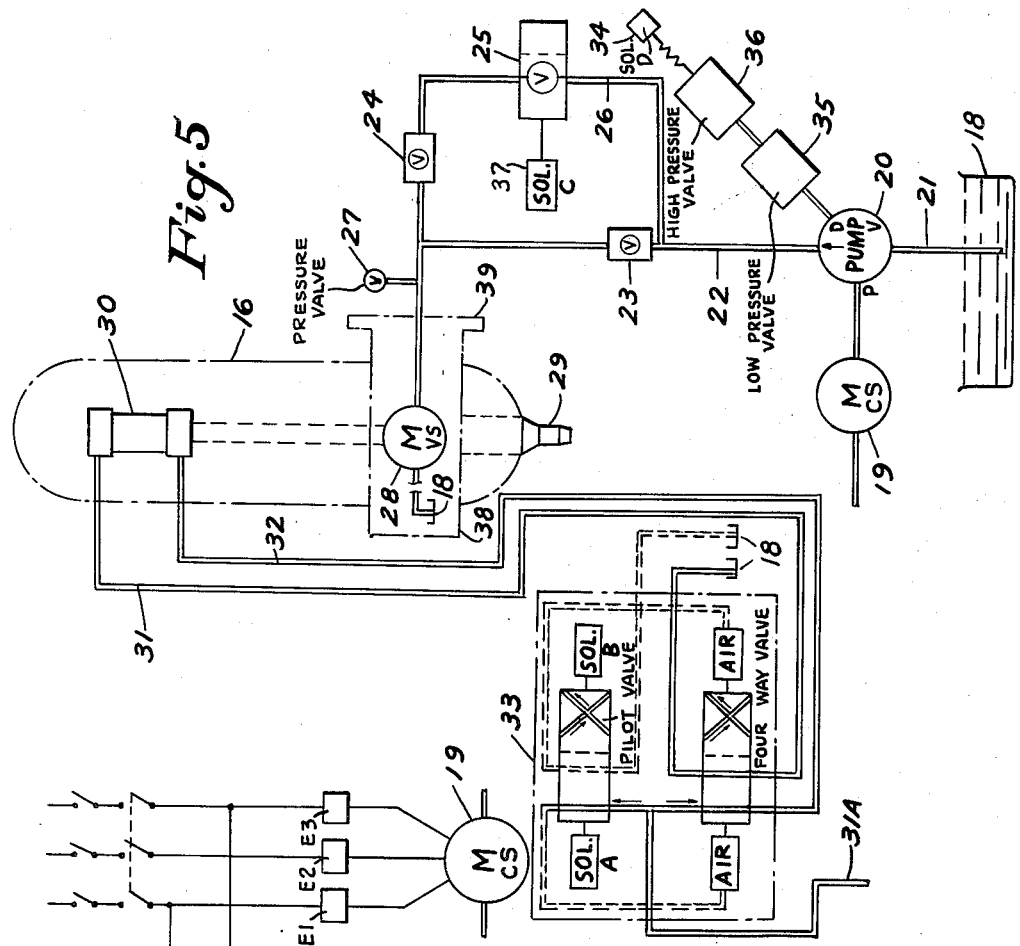
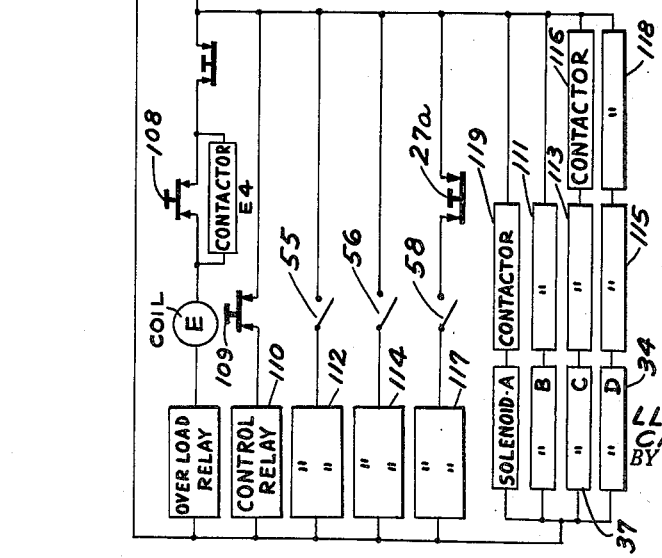
INVENTORS
LLEWELLYN A. HAUTAU
CHARLES F. HAUTAU
BY
Edward M. Apple
ATTORNEY Patented Feb. 10, 1953

2,627,770

UNITED STATES PATENT OFFICE 2,627,770

POWER-OPERATED, PREDETERMINED-TORQUE CONTROL SOCKET WRENCH

Llewellyn A. Hautau, Detroit, and Charles F. Hautau, Huntington Woods, Mich.

Application September 8, 1951, Serial No. 245,726

22 Claims. (Cl. 81—52.4)

1

This invention relates to machine tools and has particular reference to a highly sensitive positively controlled torque tool for automatically and quickly seating fasteners such as nuts, bolts, cap screws and the like. It may be employed also for removing such fasteners or for tapping operations.

An object of the invention is to provide a torquing tool which may be used in the rapid assembly of airplane engines and the like, wherein it is essential to predetermine, limit and control the torque, so as not to damage or destroy the highly expensive and sometimes fragile parts such as light weight, radial motor housing castings and the like. Many such castings, each having a value of thousands of dollars, have been entirely ruined or made dangerous to use by the over torquing of a single fastener or by the uneven or inconsistent torquing of a multiplicity of such fasteners.

Heretofore it has been the practice to perform such operations with the use of manually operated tools such as impact tools, rotary nut setters or other torquing tools, with the result that:

A consistent torquing of a predetermined value cannot be achieved with the above torque tools when governed by the discretion of the operator and in addition to the varying of the torque values it is simple to strip the threads or split the nut should the operator misjudge the developed torque and in torquing fasteners in aluminum and magnesium castings the "hammer action" of such devices prove highly detrimental as it tends to effect a redistribution of the existing residual stresses in the metal.

With rotary nut setters and other torque tools and machines now known to the public, the torquing is effected by speeds which are fixed and cannot be varied to control the rotational inertia of the machine as the fastener approaches its seated position. Such tools are satisfactory only for use with comparatively small fasteners where accuracy and consistency in torquing is not of paramount importance.

It is therefore proposed, by the use of the machine embodying this invention, to obviate the foregoing difficulties and to provide a power torque tool which is fool proof, efficient in operation, comparatively simple in basic construction and one which may be automatically, sensitively, consistently and accurately controlled to regulate and limit the torque output in critical situations.

Another object of the invention is to provide a torque unit which is power driven with a hydraulic motor, with means arranged to stall the

2 hydraulic motor at a predetermined torque value at the fastener.

Another object of the invention is to provide a machine having a sensitive feeler mechanism adapted to control the speed of rotation of the torque unit.

The foregoing and other objects and advantages of the invention will appear as the description proceeds, reference being made from time to time to the accompanying drawings forming part of the within disclosure, in which drawings:

Fig. 5 is a diagrammatic view illustrating the hydraulic system employed with the device.

Fig. 6 is a diagrammatic view of the electrical system employed with the device.

Figure 1:
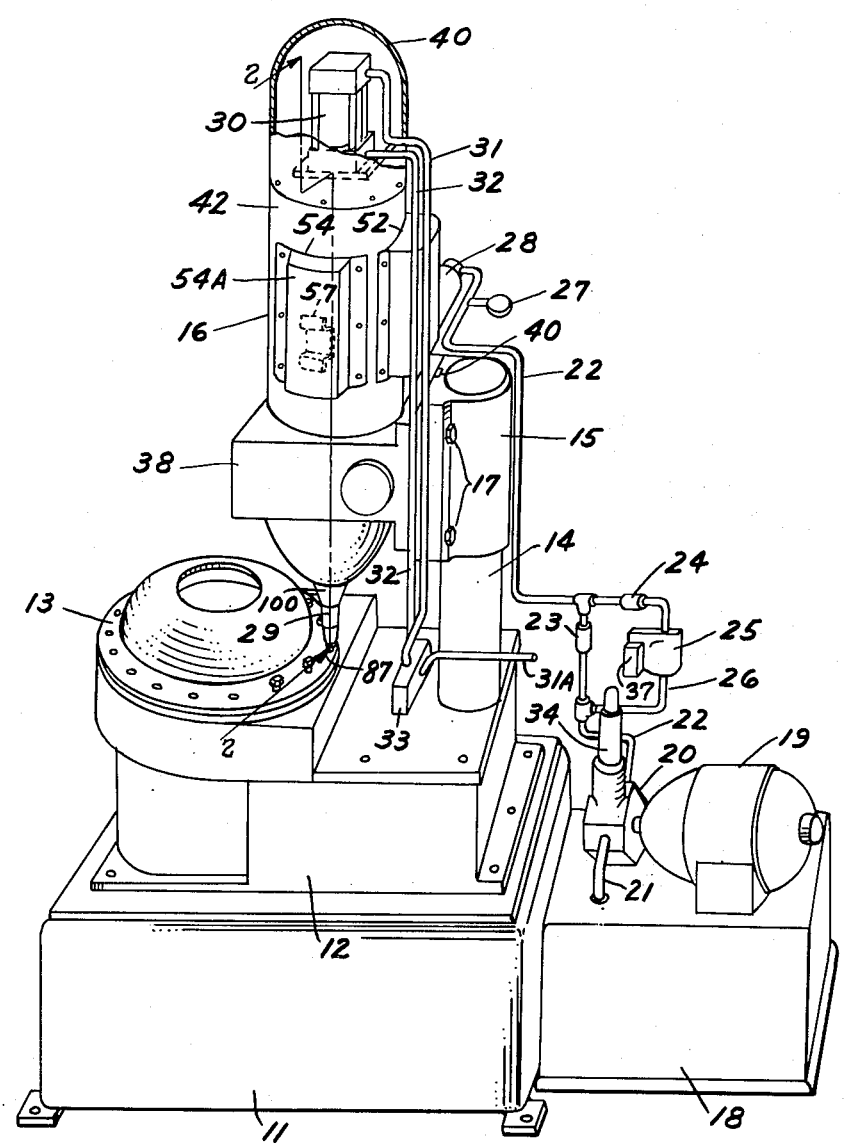
Fig. 1 is a perspective view of a device embodying the invention mounted for use with a fixture for holding a casting and another element into which it is desired to torque a cap screw.

Referring now more particularly to the drawings, it will be understood that in the embodiment herein disclosed, the reference character 11 indicates a housing or base upon which is mounted a fixture 12 which is adapted to support a work piece 13. To the fixture 12 is secured a column 14 on which is mounted for relative adjustment the bracket 15 which supports the principal parts of the torquing head 16, described more fully hereinafter.

The torquing head 16 and the bracket 15 are held in fixed position on the column 14 by means of the cap screws 17. The reference character 18 indicates a hydraulic reservoir on the outside of which is supported an electric motor 19 which is adapted to drive a hydraulic pump 20 to which are connected the hydraulic lines 21 and 22 comprising part of the hydraulic circuit illustrated in Fig. 5 of the drawings. The hydraulic line 22 is provided with a flow control valve 23 and a flow control valve 24 and a solenoid operated valve 25. The latter valves 24 and 25 being positioned in parallel with the valve 23 in the bypass line 26. The upper end of the hydraulic line 22 communicates with a pressure valve 27 and with a hydraulic motor 28 which functions to rotate the wrench socket 29, as hereinafter described. A fluid cylinder 30 having a double acting piston therein is positioned in the torque head 16, the piston of which is actuated preferably by air or other cushioning element which enters and leaves the cylinder 30 through the lines 31 and 32. The piston (not shown) in the cylinder 30 is adapted to raise and lower the mechanism carrying the wrench socket 29 as hereinafter described. The line 31A is connected to a separate source of fluid power such as an air supply or the like. The flow of fluid through the lines 31 and 32 is controlled by means of a solenoid operated valve 33 (Figs. 1 and 5). It will be understood that in this embodiment the fluid employed to operate the cylinder 30 is compressed air and the valve 33 in this instance will be a solenoid operated two way air valve, although a hydraulic fluid could be employed with substantially equal facility.

The pressure of the pump 20 is controlled by means of a solenoid 34 which actuates the low and high pressure valves 35 and 36 respectively (Fig. 5). The valve 25 is operated by means of a solenoid 37 as hereinafter described.

Figure 2:
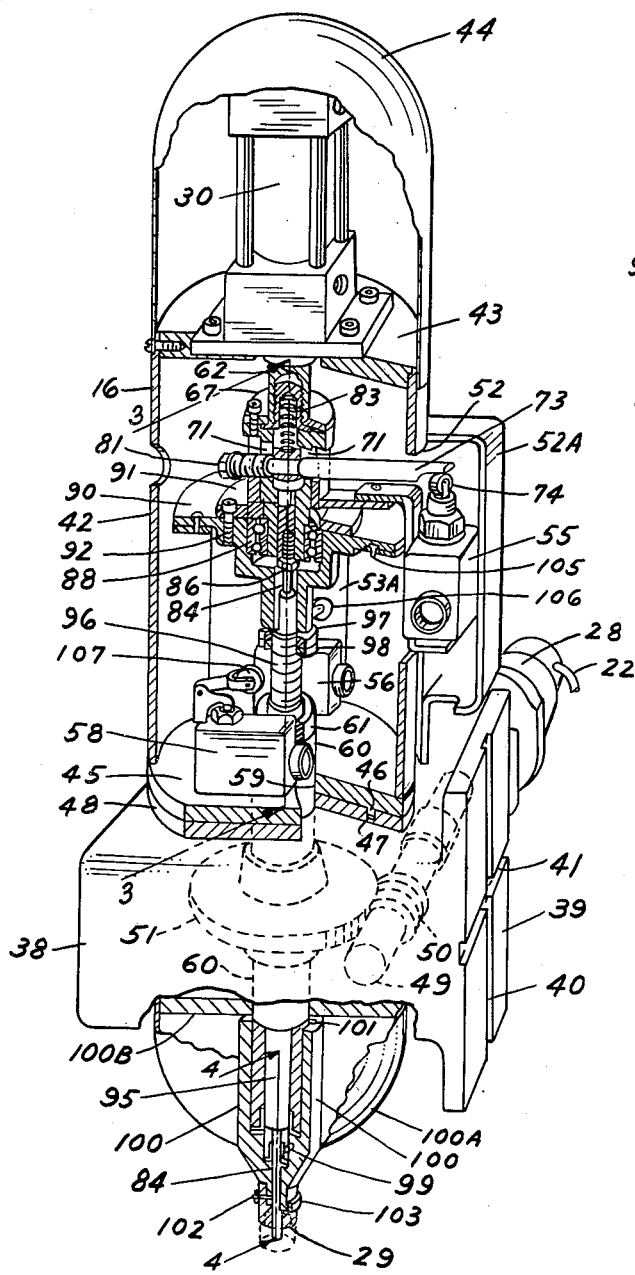
Fig. 2 is a section taken substantially on the line 2—2 of Fig. 1.

We will now describe the component parts of the torque head 16. The elements of the torque head 16 are carried on and supported by means of a base 38 which is provided with a flange 39 (Fig. 2) which is grooved vertically and horizontally as at 40 and 41, which grooves 40 and 41 are adapted to accommodate elements formed on the bracket 15 so that proper alignment of the torquing head 16 may be obtained. The working parts of the torquing head 16 are enclosed within a housing 42 (Figs. 1 and 2) on the top of which is positioned a plate 43, which is adapted to support the air cylinder 30, the latter being enclosed within a shell 44 which also serves as a housing.

The housing 42 is welded to a plate 45 (Fig. 2) which plate 45 is provided with an annular ring 46 which is adapted to engage an annular groove 47 formed in the bearing retaining cap 48 which is an integral part of the speed reducing assembly which includes the shaft 49, worm 50 and the worm gear 51, all of which are adapted to be driven by the hydraulic motor 28 and, which in turn, rotate the wrench socket 29 through the elements hereinafter described. The housing 42 is provided with cutouts 52, 53, and 54 which are respectively covered with covers 52A, 53A, and 54A. The cover 52A protects the high speed control switch 55 and the cover 53A serves to support a bracket (not shown) on which is mounted the low speed control switch 56, the function of which will be explained hereinafter, and the cover 54A is adapted to support on its inside the bracket 57, on which is mounted the positioner control switch 58, the function of which will be explained more fully hereinafter.

The plate 45 and the bearing retaining cap 48 are provided with a central opening 59 through which is extended the shaft 60 of the worm gear 51, at the upper end of which shaft 60 is positioned a rubber cushion 61 which serves to limit the downward stroke of the elements hereinafter described, which are carried at the end of the piston rod 62 which is in turn secured to the piston (not shown) which reciprocates in the cylinder 30.

Figure 3:
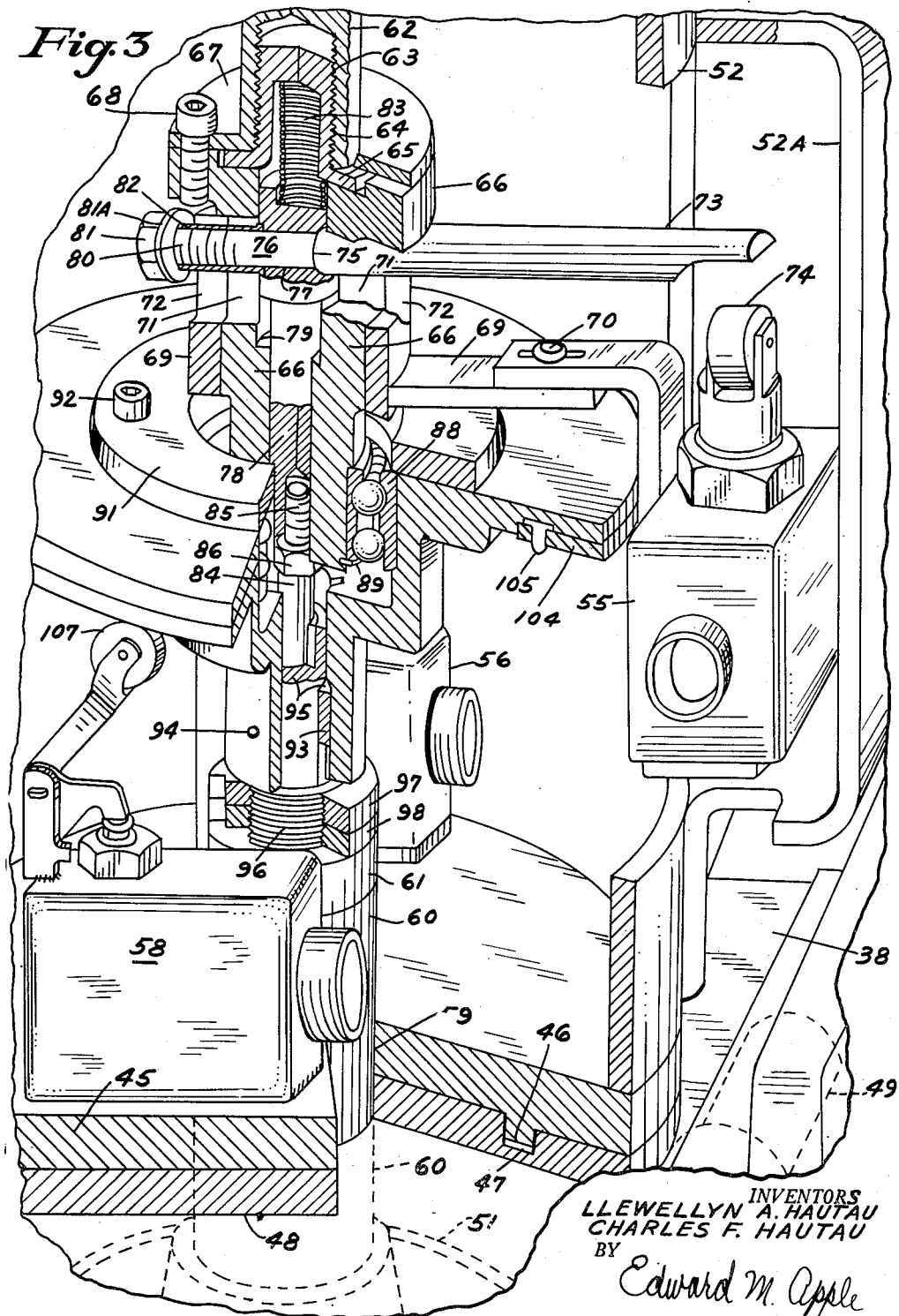
Fig. 3 is a section taken substantially on the line 3—3 of Fig. 2.

The piston rod 62 has formed at one end an internally threaded portion 63 into which is threaded the externally threaded plug member 64 which is provided with a flange 65 which is adapted to support a high speed control switch carrier 66 which is in turn secured to the flange 65 by means of the annular ring 67 and the machine screws 68 (Fig. 3).

Secured to the member 66 is a bracket 69, which is adjustable as at 70, and to which is secured the high speed control switch 55. It will be noted that the elements 63 to 70 inclusive as well as the switch 55 reciprocate in unison with the piston rod 62.

The carrier member 66 is slotted as at 71 and the collar of the bracket member 69 is slotted as at 72 which slot is adapted to accommodate the switch control arm 73 which is adapted to depress the roller 74 of the high speed control switch 55. The switch control arm 73 has a shoulder 75 and a reduced portion 76 which is adapted to be extended through an opening 77 formed in a stepped cylinder element 78 which is arranged to seat in a recess 79 formed in the carrier member 66. The free end of the switch control arm 73 is threaded as at 80 and is adapted to accommodate the nut 81 and washer 81A which together with the bushing 82 serves to lock the arm 73 into non-rotating engagement with the coupling member 78.

It will be noted that the arm 73 and the feeler coupling 78 have relative vertical movement with respect to the carrier 66, and the elements 73 and 78 are normally urged downwardly into seating relation with the recess 79 under the influence of the compression spring 83.

Figure 4:
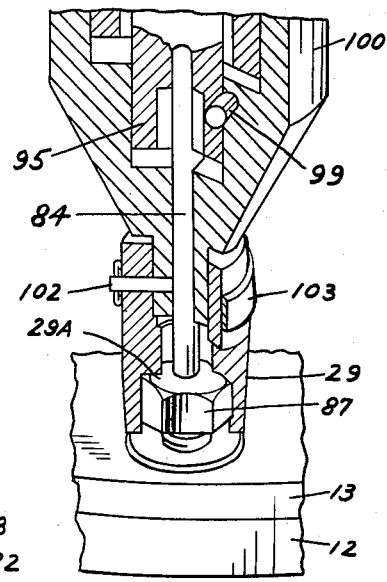
Fig. 4 is a section taken substantially on the line 4—4 of Fig. 2.

Secured to the lower end of the feeler coupler 78 is a threaded feeler rod 84 which engages a threaded bore formed in the end of the coupler member 78. A lock nut 86 is provided so that the over all length of the feeler rod 84 and coupler 78 may be adjusted. The lower end of the feeler rod 84 (Figs. 2 and 4) is adapted to contact the head 87 of the fastening element 87 which it is desired to torque into seating position in the casting 13. It will be understood that the device may be used to accommodate nuts as well as cap screws or other fasteners. The purpose of the feeler rod 84 and its connecting elements is to sensitively control the high speed torquing cycle as hereinafter explained.

The high speed control switch carrier 66 is shouldered against a ball bearing assembly 88 which together with the snap ring 89 transmits the reciprocating motion from the member 66 to the cam carrier 90. The bearing 88 is retained by means of an annular ring 91 which is secured to the cam carrier 90 by means of Allen screws 92 or other suitable means. The cam carrier 90 is keyed as at 93 and pinned as at 94 (Fig. 3) to a hollow follower shaft 95 in which the previously described feeler rod 84 is adapted to reciprocate. The follower shaft 95 has an enlarged threaded area 96 which is adapted to be engaged by the spanner nuts 97 and 98, whereby the length of the stroke of the reciprocating elements may be limited as the nut 98 contacts the rubber cushion 61 which is carried at the upper end of the worm gear shaft 60 as previously described. The portion of the follower shaft 95 below the threaded area 96 extends through the hollow gear shaft 60 and is secured by means of a pin 99 to the torque wrench 100 which wrench 100 is rotated by the gear shaft 60 through the key 101. The elements 95, 100 and 101 are preferably housed in a semispherical dome 100A which is secured to a plate member 100B which is secured to the base 38.

It will be understood that the wrench 100 is arranged for reciprocating motion on the lower end of the gear shaft 60 through the influence of the follower shaft 95 and pin 99.

The wrench socket 29 previously described is secured to the wrench 100 by means of a pin 102 which is retained in position by means of a spring clip 103.

Secured to the lower face of the annular portion of the cam carrier 90 is a cam ring 104 (Figs. 2 and 3), the lower face of which is adapted to engage the roller 106 of the low speed control switch 56. The cam ring 104 is also provided with a plurality of depending buttons 105 equal in number to the faces on the head of the fastener 87 which buttons are adapted to engage the roller 107 of the positioner control switch 58 to stop the rotation of the wrench in any desired position as hereinafter described.

It will be understood, of course, that the cam plate 104 rotates under the influence of the follower shaft 95 and is given reciprocating motion through the bearing assembly 88 and the snap ring 89, by the high speed control switch carrier 66 (Fig. 3).

A typical operating cycle of the device may be defined in the following phases:

Starting position
Approach
Wrench at high speed
Wrench at low speed
Torquing and positioning
Return to starting position

*Starting position.*—The operator pushes the starting switch 108 (Fig. 6). This closes the contact E4 through the coil E and the contactors E1, E2, and E3 on the electric motor 19, causing the motor 19 to start. The switch 108 remains closed and the motor 19 continues to operate driving the hydraulic pump at a fixed speed with a low torque through the valve 35. The wrench socket 29 runs at low speed because the bypass line 26 is closed by valve 25. The pump 20 delivers pressure to the hydraulic motor 28 through the flow control valve 23 and to pressure regulating valve 27. At the same time, air will be admitted through the line 31A and the valve 33 causing air to be admitted to the lower end of the cylinder 30 through the air line 32. This holds the wrench socket 29 and its associated elements in their retracted or elevated position.

*Approach.*—The operator now manually inserts the cap screw 87 in the work piece 13. The operator then presses the switch 109. This energizes the control relay 110 closing the contactor 111, which results in energizing the solenoid B of the air valve 33. This admits air to the upper end of the cylinder 30 through the line 31, moving the piston of the cylinder 30 downwardly, carrying with it the rod end 62 and the elements 64, 66, 67, 83, 73, 78, 69, 55, 88, 90, 91, 104, 105, 84, 95, 97, 98, 99, 100, 102, 103, and 29. Upon its downward movement, the wrench socket 29 engages the head of the fastener while traveling at low speed and low torque. This obviates any tendency to strip the threads in the event that the fastener has not been properly started.

*Wrench at high speed.*—While the parts just described are still traveling downwardly and after the wrench socket 29 has engaged the head of the fastener 87 to a depth of approximately ⅛ of an inch, at this instant the end of the feeler rod 84 contacts the head of the fastener 87. It will be understood that the feeler rod 84 and its associated elements move downwardly under the influence of the compression spring 83 and its downward movement is limited by the contact of the member 78 with the recess 79 formed in the member 66 and by the lower end of the feeler rod 84 coming in contact with the fastener 87. The impingement of the lower end of the feeler rod 84 on the head of the fastener 87 initiates a relative movement of the feeler rod 84 with respect to the downward movement of the wrench socket 29. This relative movement is permitted by the slot 71 and spring 83. When this relative movement reaches a predetermined value, the roller 74 of the switch 55, which is still moving downwardly with the elements 69 and 66, is moved out of contact with the control arm 73, permitting the switch 55 to become energized. The energizing of the switch 55 causes the control relay 112 to close the contactor 113, while the contactor 116 normally remains closed, thus energizing the solenoid C or 37, which opens the control valve 25 permitting an increased flow of fluid to the motor 28 through the line 26 and the control valve 24. This increased flow causes the motor 28 to rotate at high speed which in turn causes the wrench socket 29 and the fastener 87 to rotate at high speed. All during the rotation of the socket 29 and the fastener 87 at high speed, the socket 29 is moving downwardly with the fastener 87 under the influence of the air cylinder 30. This downward movement continues at a certain speed until the shoulder 29A (Fig. 4) of the socket 29 contacts the upper face of the head of the fastener 87, after which the downward speed is determined by the rate of travel of the fastener 87 on its threads.

*Wrench at low speed.*—At a predetermined position on the downward movement of the cylinder rod 62 and its associated elements, the flat portion of the cam 104 contacts the roller 106 of the low speed control switch 56. This energizes the control relay 114 which in turn closes the contactor 115 and opens the contactor 116. The closing of the contactor 115 energizes the solenoid D or 34 which puts the pump 20 under high pressure through the valve 36 and motor 28, the contactor 118 remaining closed.

The opening of the contactor 116 de-energizes the solenoid C or 37 thereby decreasing the oil flow to the motor 28 consequently reducing the wrench socket 29 rotational speed. It will be understood that the greater portion of the downward travel of the reciprocating elements and the fastener 87 will occur during the high speed cycle of the device.

*Torquing and positioning.*—When the resistance to the turning of the socket 29 and fastener 87 increases to a predetermined point, it causes an increased pressure in the fluid line to the hydraulic motor 28 and inasmuch as the pressure valve 27 is interposed between the pump 20 and the hydraulic motor 28, this valve 27 will be energized when the pressure in the line reaches a predetermined value as established by the required torque. When switch 27a of the pressure valve 27 is energized, the cam plate 104 will rotate until one of the buttons 105 thereon contacts the roller 107 of the switch 58 and inasmuch as the switches 27a and 58 are in series, the control relay 117 will now be energized closing the contactor 119 and opening the contactor 118. The opening of the contactor 118 results in the de-energizing of the solenoid D or 34, and placing the hydraulic pump 20 at low pressure through the valve 35, resulting in low torque, this torque is not sufficient to overcome the torque resistance of the fastener 87 with the result that it stalls the motor 28, stopping the wrench socket 29 at the required position. The closing of the contactor 119 energizes the solenoid A of valve 33 admitting air to the lower end of cylinder 30 lifting the socket 29 and associated elements and causing the return of the wrench socket 29 to the starting position.

Having described our invention, what we claim and desire to secure by Letters Patent is:

1. In a device of the character described in combination, a wrench socket, hydraulic variable speed power means for rotating said socket, a plurality of control means for varying the speed of said power means, including, a solenoid operated valve, limit switches for energizing and de-energizing said solenoid reciprocating elements for supporting said socket, and a feeler rod slidable in said reciprocating elements and said socket and having an arm associated therewith for actuating one of said limit switches in the control means for at least one of the speeds of said first named power means.

2. The structure of claim 1, including a cam member reciprocable with said socket supporting elements and rotatable with said socket, said cam having a surface arranged to actuate the control means for another of the speeds of said first named power means.

3. The structure of claim 1, including a cam member reciprocable with said socket supporting elements and rotatable with said socket, said cam having a surface arranged to actuate one of the limit switches in the control means for another of the speeds of said first named power means, and elements on said cam for actuating others of the limit switches, and a pressure regulating valve for stopping said first named power means.

4. In a device of the character described in combination, a wrench socket, variable speed hydraulic power means for rotating said socket, a plurality of control means for varying the speed and torque of said power means, including solenoid operated valves and a pressure valve, limit switches for energizing and de-energizing said solenoid valves, reciprocating elements for supporting said socket, a feeler rod slidable in said reciprocating elements and said socket and having an arm associated therewith for actuating one of said limit switches in the control means for at least one of the speeds of said first named power means and means energized by said pressure valve for limiting the torque of said power means.

5. The structure of claim 4, including a cam member reciprocable with said socket supporting elements and rotatable with said socket, said cam having elements arranged to actuate the limit switches in the said control means.

6. In a device of the character described in combination, a wrench socket, variable speed power means for rotating said socket, a plurality of control means for varying the speed and torque of said power means, including solenoid operated valves and a pressure valve, limit switches for energizing and de-energizing said solenoids, a switch actuated by said pressure valve reciprocating elements for supporting said socket, and a feeler rod slidable in said reciprocating elements and said socket and having an arm associated therewith for actuating one of said limit switches in the said control means for at least one of the speeds of said first named power means, a cam member reciprocable with said socket supporting elements and rotatable with said socket, said cam having a surface arranged to actuate other of the limit switches and the pressure regulating valve in the said control means for another of the speeds of said first named power means and having elements thereon adapted to actuate a switch in series with said pressure valve actuated switch for positioning said socket and stopping the said first named power means.

7. A machine of the character described, comprising in combination, a work holder, a torquing head including a wrench in reciprocable relation to said work holder, power means for reciprocating said wrench, power means for rotating said wrench, controls for both of said power means, and a feeler rod slidable in said wrench and having an arm secured thereto and arranged to actuate at least one of the controls for said power means.

8. A machine of the character described, comprising in combination, a work holder, a torquing head including a wrench in reciprocable relation to said work holder, power means for reciprocating said wrench, power means for rotating said wrench, controls for both of said power means, a feeler rod slidable in said wrench and having an arm secured thereto arranged to actuate at least one of the controls for said power means, and a cam mounted for rotatable and reciprocable motion with said wrench, said cam having elements thereon arranged to actuate others of the controls for said power means.

9. In a device of the character described including a wrench, rotary and reciprocatory power means for moving said wrench, said reciprocatory means comprising a cylinder and piston, a piston rod and hollow follower shaft carried by said piston rod, a switch for controlling the rotary power means carried by said piston rod, a coupler slidable in an extension of said rod, a feeler rod adjustably secured to said coupler and slidable in said follower shaft and said wrench, an arm on said feeler rod arranged to actuate said switch, and a hollow gear shaft connected to said rotary power means and slidably keyed to said follower shaft.

10. The structure of claim 9, including resilient abutment elements on said hollow gear shaft for limiting the movement in one direction of the elements carried by said piston rod.

11. The structure of claim 9, in which said coupler and said feeler rod are axially urged away from said piston rod by a spring and the said axial movement of said coupler and said feeler rod is limited by an abutment formed on the said rod extension member.

12. The structure of claim 9, including two additional switches for controlling the rotary and reciprocating power means, there being a cam rotatable and reciprocable with said follower shaft, with elements thereon for actuating said last named switches.

13. The structure of claim 9, including adjustable elements on said follower shaft for limiting in one direction the relative movement between said hollow gear shaft and said follower shaft.

14. The structure of claim 9, there being a slot in the said rod extension member through which said feeler rod arm is arranged to extend, whereby to permit relative movement between said arm and said rod extension member.

15. In a device of the character described in combination, a work holder, a torque head adjustably mounted adjacent thereto, said head including a wrench socket mounted for rotary and reciprocable movement with respect to said work holder, hydraulic power means for rotating said socket, cushioning power means for reciprocating said socket, electrical circuits including switches for controlling said rotating and rerocating power means, and a feeler rod slidable in said socket and having an arm thereon arranged to actuate one of said switches.

16. The combination defined in claim 15, including a cam member mounted for rotation and reciprocation with said socket, said cam member having elements thereon arranged to actuate other of the switches in said electrical circuits, whereby to change the speed and torque output of said rotary power means.

17. In a device of the character described in combination, a work holder, a work piece on said holder adapted to receive a fastener, a fastener, a torque head mounted adjacent said work holder, said torque head having a wrench socket adapted to engage and rotate said fastener and travel axially therewith, hydraulic power means for moving said socket axially, electric circuits including switches for controlling said power means, and a feeler rod slidable in said socket and having an end portion arranged to sensitively contact the head of said fastener, said feeler rod having an arm secured thereto arranged to actuate one of said switches.

18. In a device of the character described in combination, a work holder, a work piece on said holder, said work piece being arranged to receive a fastener, a fastener, a torque head mounted adjacent said work holder, said torque head having a wrench socket adapted to engage and rotate said fastener and travel axially therewith, hydraulic power means for rotating said socket, cushioning power means for moving said socket axially, electric circuits including switches for controlling said rotating and cushioning power means, one of said switches being a pressure switch which is responsive to the pressure developed in said hydraulic power means, and a spring backed feeler rod slidable in said socket and having one end arranged to contact the head of said fastener, said feeler rod having an arm secured near its other end which arm is arranged to actuate one of said switches, whereby to change the speed of operation of said hydraulic power means.

19. In a device of the character described in combination, a work holder, a work piece on said holder, said work piece being arranged to receive a fastener, a fastener, said fastener having a head with a plurality of faces, a torque head adjustably mounted adjacent said holder, said torque head having a wrench socket mounted for rotary and reciprocable movement, hydraulic power means for rotating said socket, cushioning power means for reciprocating said socket, electrical circuits including switches for controlling said rotating and reciprocating power means, a cam member rotatable and reciprocable with said socket, said cam member having a plurality of buttons thereon equal in number to the faces on the head of said fastener, each of said buttons being arranged to actuate one of said switches during a single revolution of said cam, whereby to effect the movement of said hydraulic power means to stop the rotation of said fastener in a predetermined position with respect to said work piece.

20. In a device of the character described in combination, a work holder, a work piece on said holder, said work piece having a threaded opening therein, a threaded fastener in said opening, said fastener having a head with a plurality of faces, a torque head adjustably mounted adjacent said holder, said torque head having a wrench socket mounted for rotary and reciprocable movement, hydraulic power means for rotating said socket, cushioning power means for reciprocating said socket, electrical circuits including switches for controlling said rotating and reciprocating power means, a spring backed feeler rod slidable in said socket and arranged so that one end thereof may contact the head of said fastener, said feeler rod having an arm thereon arranged to actuate one of said switches, a cam member rotatable and reciprocable with said socket, said cam member having a plurality of buttons thereon equal in number to the faces on the head of said fastener, each of said buttons being arranged to actuate another of said switches during a single revolution of said cam, whereby to effect the movement of said hydraulic power means to stop the rotation of said fastener in a predetermined position with respect to said work piece.

21. In a device of the character described in combination, a wrench socket, means to cause axial travel of said socket, hydraulic power means for rotating said socket, and means for varying the speed of the socket throughout its distance of axial travel, said means including a feeler mechanism slidable with respect to said socket and a pressure switch arranged to stall said hydraulic power means at a predetermined torque value.

22. In a device of the character described in combination, a wrench socket, means to cause axial travel of said socket, power means for rotating said socket, means for varying the torque of said socket throughout its distance of axial travel, said last named means including a feeler mechanism slidable with respect to said socket and elements for controlling said power means, at least one of said elements being actuated by said feeler mechanism.

LLEWELLYN A. HAUTAU.
CHARLES F. HAUTAU.

REFERENCES CITED

The following references are of record in the file of this patent:

UNITED STATES PATENTS

| Number | Name | Date |
|---|---|---|
| 2,292,146 | Meunier | Aug. 4, 1942 |
| 2,299,956 | Stever | Oct. 27, 1942 |
| 2,346,352 | Boxell | Apr. 11, 1944 |
| 2,379,878 | Bronander | July 10, 1945 |
| 2,384,399 | Reynolds | Sept. 4, 1945 |
| 2,394,348 | Wilhide | Feb. 5, 1946 |